US012763064B2

(12) United States Patent
Wang et al.

(10) Patent No.: US 12,763,064 B2
(45) Date of Patent: Oct. 13, 2026

(54) TIMBRE SELECTION METHOD AND APPARATUS, ELECTRONIC DEVICE, READABLE STORAGE MEDIUM, AND PROGRAM PRODUCT

(71) Applicant: Beijing Zitiao Network Technology Co., Ltd., Beijing (CN)

(72) Inventors: Keke Wang, Beijing (CN); Chen Ding, Beijing (CN); Xudong Mao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 127 days.

(21) Appl. No.: 18/708,538

(22) PCT Filed: Nov. 10, 2022

(86) PCT No.: PCT/CN2022/131094
§ 371 (c)(1),
(2) Date: May 8, 2024

(87) PCT Pub. No.: WO2023/083252
PCT Pub. Date: May 19, 2023

(65) Prior Publication Data

US 2025/0029594 A1 Jan. 23, 2025

(30) Foreign Application Priority Data

Nov. 11, 2021 (CN) ......................... 202111332976.5

(51) Int. Cl.
*G10L 13/033* (2013.01)
*G10L 13/04* (2013.01)
(Continued)

(52) U.S. Cl.
CPC ............ *G10L 13/033* (2013.01); *G10L 13/04* (2013.01); *G10L 21/0308* (2013.01); *G10L 25/18* (2013.01)

(58) Field of Classification Search
CPC ... G10L 13/033; G10L 13/04; G10L 21/0308; G10L 25/18
See application file for complete search history.

(56) References Cited

U.S. PATENT DOCUMENTS 10,706,867 B1 * 7/2020 Villavicencio ........ G10L 21/013
2013/0151256 A1 * 6/2013 Nakano ............... G10L 13/0335 704/268

(Continued)

FOREIGN PATENT DOCUMENTS

CN 103065623 A 4/2013
CN 107767879 A * 3/2018 ........... G10L 21/007

(Continued)

OTHER PUBLICATIONS

International Patent Application No. PCT/CN2022/131094; Int'l Written Opinion and Search Report; dated Dec. 15, 2022; 7 pages.

(Continued)

*Primary Examiner* — Bhavesh M Mehta
*Assistant Examiner* — Eunice Lee
(74) *Attorney, Agent, or Firm* — BakerHostetler

(57) ABSTRACT

The present disclosure relates to a timbre selection method and apparatus, an electronic device, a readable storage medium, and a program product. According to the method, a timbre feature of a speech to be matched is obtained by analyzing a spectral feature of the speech to be matched, and then a target sample audio is determined from at least one sample audio based on a similarity between the timbre feature of the speech to be matched and a timbre feature of the at least one sample audio, where a timbre of the target (Continued)

sample audio matches the timbre of the speech to be matched.

20 Claims, 5 Drawing Sheets

(51) Int. Cl.
*G10L 21/0308* (2013.01)
*G10L 25/18* (2013.01)

(56) References Cited

U.S. PATENT DOCUMENTS

| | | | |
|---|---|---|---|
| 2015/0112680 | A1 | 4/2015 | Lu |
| 2020/0058288 | A1 | 2/2020 | Lin et al. |
| 2020/0074981 | A1 | 3/2020 | Chae et al. |

FOREIGN PATENT DOCUMENTS

| | | | | | |
|---|---|---|---|---|---|
| CN | 110335622 | A | * | 10/2019 | G10L 15/16 |
| CN | 110867177 | A | | 3/2020 | |
| CN | 111031386 | A | | 4/2020 | |
| CN | 111312208 | A | | 6/2020 | |
| CN | 111599342 | A | | 8/2020 | |
| CN | 112331222 | A | * | 2/2021 | G10L 25/30 |
| CN | 113223532 | A | * | 8/2021 | G06F 18/22 |
| CN | 113362800 | A | | 9/2021 | |
| CN | 113851140 | A | * | 12/2021 | G10L 19/173 |
| CN | 113192484 | B | * | 9/2024 | G10L 25/24 |
| WO | WO 2014/008843 | A1 | | 1/2014 | |

OTHER PUBLICATIONS

China Patent Application No. 202111332976.5; Office Action; dated May 28, 2026; 12 pages.

* cited by examiner

TIMBRE SELECTION METHOD AND APPARATUS, ELECTRONIC DEVICE, READABLE STORAGE MEDIUM, AND PROGRAM PRODUCT

CROSS-REFERENCE TO RELATED APPLICATIONS

The present application is a National Stage Entry of International application No. PCT/CN2022/131094 filed on Nov. 10, 2022, which is based on and claims priority to Chinese Application No. 202111332976.5, filed on Nov. 11, 2021, which are incorporated herein by reference in their entireties.

TECHNICAL FIELD

The present disclosure relates to the field of artificial intelligence technologies, and particularly to a timbre selection method and apparatus, an electronic device, a readable storage medium, and a program product.

BACKGROUND OF THE INVENTION

With the continuous development of artificial intelligence technologies, great changes have taken place in voice-related fields, particularly in the field of dubbing, which has also transformed from the traditional mode of real-person dubbing to the mode of automatic dubbing using speech synthesis models. A speech synthesis system typically provides a large number of speech synthesis models with different timbres. These speech synthesis models pre-synthesize some sample audios. When dubbing is needed, a user can select a suitable speech synthesis model based on timbres of the sample audios.

SUMMARY OF THE INVENTION

The present disclosure provides a timbre selection method and apparatus, an electronic device, a readable storage medium, and a program product.

According to a first aspect, the present disclosure provides a timbre selection method, including:

performing spectral feature extraction on a speech to be matched, to obtain a spectral feature of the speech to be matched;

performing timbre feature extraction on the spectral feature of the speech to be matched, to obtain a timbre feature of the speech to be matched; and determining a target sample audio from at least one initial sample audio based on the timbre feature of the speech to be matched and a timbre feature of the at least one initial sample audio, where a timbre of the target sample audio matches the timbre feature of the speech to be matched.

As a possible implementation, the timbre feature includes a feature in one or more specific dimensions; and the determining a target sample audio from at least one initial sample audio based on the timbre feature of the speech to be matched and a timbre feature of the at least one initial sample audio includes:

obtaining a similarity between a feature, in the specific dimension, of the timbre of the speech to be matched and the timbre of the at least one initial sample audio in the specific dimension according to a preset order corresponding to the one or more specific dimensions; and performing step-by-step selection based on the similarity between the feature, in the specific dimension, of the timbre of the speech to be matched and the timbre of the at least one initial sample audio in the specific dimension, to determine the target sample audio from the at least one initial sample audio.

As a possible implementation, the feature in the one or more specific dimensions includes a timbre style feature and/or a voiceprint feature.

As a possible implementation, the determining a target sample audio from at least one initial sample audio based on the timbre feature of the speech to be matched and a timbre feature of the at least one initial sample audio includes:

determining a plurality of candidate sample audios from a plurality of initial sample audios based on the timbre feature of the speech to be matched and timbre features of the plurality of initial sample audios; and determining the target sample audio from the plurality of candidate sample audios.

As a possible implementation, before the performing spectral feature extraction on a speech to be matched, to obtain a spectral feature of the speech to be matched, the method further includes:

performing speech segmentation on an original speech, to obtain at least one speech segment; and performing clustering on the at least one speech segment, to obtain the one or more speech segment sets, where each of the speech segment sets belongs to one voice role, and one of the speech segment sets includes the speech to be matched.

As a possible implementation, before the performing speech segmentation on an original speech, the method further includes:

performing speech separation on an overlapping speech segment in the original speech, to obtain a speech segment corresponding to each voice role in the overlapping speech segment.

As a possible implementation, the method further includes:

inputting a text to be dubbed to a speech synthesis model corresponding to the target sample audio, to obtain a target dub output by the speech synthesis model.

According to a second aspect, the present disclosure provides a timbre selection apparatus, including:

a spectral feature extraction module configured to perform spectral feature extraction on a speech to be matched, to obtain a spectral feature of the speech to be matched;

a timbre feature extraction module configured to perform timbre feature extraction on the spectral feature of the speech to be matched, to obtain a timbre feature of the speech to be matched; and a matching module configured to determine a target sample audio from at least one initial sample audio based on the timbre feature of the speech to be matched and a timbre feature of the at least one initial sample audio, where a timbre of the target sample audio matches the timbre feature of the speech to be matched.

As a possible implementation, the matching module is specifically configured to obtain a similarity between a feature, in the specific dimension, of the timbre of the speech to be matched and the timbre of the at least one initial sample audio in the specific dimension according to a preset order corresponding to the one or more specific dimensions; and perform step-by-step selection based on the similarity between the feature, in the specific dimension, of the timbre of the speech to be matched and the timbre of the at least one initial sample audio in the specific dimension, to determine the target sample audio from the at least one initial sample audio.

As a possible implementation, the feature of the timbre in the one or more specific dimensions includes a timbre style feature and/or a voiceprint feature.

As a possible implementation, the matching module is specifically configured to determine a plurality of candidate sample audios from a plurality of initial sample audios based on the timbre feature of the speech to be matched and timbre features of the plurality of initial sample audios; and determine the target sample audio from the plurality of candidate sample audios.

As a possible implementation, the timbre selection apparatus further includes: a speech preprocessing module configured to perform speech segmentation on an original speech, to obtain at least one speech segment; and perform clustering on the at least one speech segment, to obtain the one or more speech segment sets, where each of the speech segment sets belongs to one voice role, and one of the speech segment sets includes the speech to be matched.

As a possible implementation, the speech preprocessing module is further configured to: before performing the speech segmentation on the original speech, perform speech separation on an overlapping speech segment in the original speech, to obtain a speech segment corresponding to each user in the overlapping speech segment.

As a possible implementation, the timbre selection apparatus further includes: a speech synthesis module configured to input a text to be dubbed to a speech synthesis model corresponding to the target sample audio, to obtain a target dub output by the speech synthesis model.

According to a third aspect, the present disclosure provides an electronic device, including a memory and a processor.

The memory is configured to store computer program instructions.

The processor is configured to execute the computer program instructions, to implement the timbre selection method according to any one of the possible implementations of the first aspect.

According to a fourth aspect, the present disclosure provides a readable storage medium, including computer program instructions. The computer program instructions are executed by at least one processor of an electronic device, to implement the timbre selection method according to any one of the possible implementations of the first aspect.

According to a fifth aspect, the present disclosure provides a computer program product. When the computer program product is executed by a computer, the timbre selection method according to any one of the possible implementations of the first aspect is implemented.

The present disclosure provides the timbre selection method and apparatus, the electronic device, the readable storage medium, and the program product. According to the method, the timbre feature of the speech to be matched is obtained by analyzing the spectral feature of the speech to be matched, and then the target sample audio is determined from the at least one initial sample audio based on the similarity between the timbre feature of the speech to be matched and the timbre feature of the at least one initial sample audio, where the timbre feature of the target sample audio matches the timbre feature of the speech to be matched.

BRIEF DESCRIPTION OF DRAWINGS

The accompanying drawings herein, which are incorporated into and form a part of the description, illustrate the embodiments in line with the present disclosure and are used in conjunction with the description to explain a principle of the present disclosure.

In order to more clearly illustrate the technical solutions in the embodiments of the present disclosure or in the related art, the accompanying drawings for describing the embodiments or the related art will be briefly described below. Apparently, those of ordinary skill in the art may still derive other drawings from these accompanying drawings without creative efforts.

DETAILED DESCRIPTION OF THE INVENTION

Figure 1:
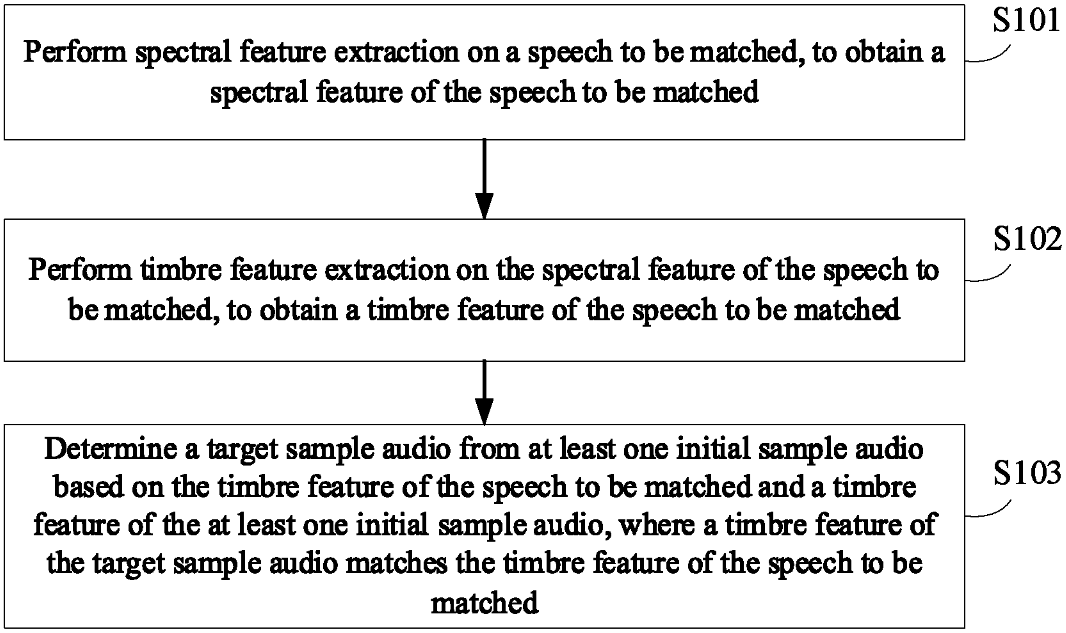
FIG. 1 is a schematic flowchart of a timbre selection method according to some embodiments of the present disclosure.

For a clearer understanding of the foregoing objectives, features, and advantages of the present disclosure, the solutions of the present disclosure will be further described below. It should be noted that the embodiments in the present disclosure and features in the embodiments can be combined with each other without conflict.

Many specific details are set forth in the following description to facilitate a full understanding of the present disclosure. However, the present disclosure may also be implemented in other ways different from those described herein. Apparently, the embodiments in the description are only some rather than all of the embodiments of the present disclosure.

Currently, a suitable timbre is usually selected manually from a sample audio library. However, as the number of speech synthesis models continues to increase, the number of sample audios and the number of roles to be dubbed are also increasing, making manual selection less efficient.

To address the above technical problem, for example, the present disclosure provides a timbre selection method and apparatus, an electronic device, a readable storage medium, and a computer program product. A timbre feature of a speech to be matched is obtained by analyzing a spectral feature of the speech to be matched, and then a target sample audio is determined from at least one initial sample audio based on a similarity between the timbre feature of the speech to be matched and a timbre feature of the at least one initial sample audio, where a timbre feature of the target sample audio matches the timbre feature of the speech to be matched. This ensures that the timbre of the selected target sample audio is a timbre desired by a user. The method provided in the present disclosure enables automatic timbre selection, thereby improving efficiency in timbre selection. Additionally, the method provided in the present disclosure can meet the need for multi-role dubbing, that is, a suitable timbre can be automatically selected for each role using the above method.

The timbre selection method of the present disclosure is performed by an electronic device. The electronic device may be a tablet computer, a mobile phone (such as a foldable phone, a large-screen phone, etc.), a wearable device, a vehicle-mounted device, an augmented reality (AR)/virtual reality (VR) device, a laptop computer, an ultra-mobile personal computer (UMPC), a netbook, a personal digital assistant (PDA), a smart television, a smart screen, a high-definition television, a 4K television, a smart speaker, a smart projector and other Internet of Things (IoT) devices, a server, a server cluster, a cloud server, or the like. The present disclosure does not impose any limitation on the specific type of the electronic device.

In the embodiments of the present disclosure, taking the electronic device as an example, the timbre selection method provided in the present disclosure will be set forth in detail with reference to the accompanying drawings and application scenarios.

FIG. 1 is a schematic flowchart of a timbre selection method according to some embodiments of the present disclosure. Referring to FIG. 1, the timbre selection method provided in this embodiment includes the following steps.

S101: Perform spectral feature extraction on a speech to be matched, to obtain a spectral feature of the speech to be matched.

An electronic device may obtain the speech to be matched, where the speech to be matched is used for timbre feature matching with an initial sample timbre. For example, the electronic device may obtain the speech to be matched through real-time recording, or may obtain the speech to be matched by processing a previously recorded original speech. The manner in which the electronic device obtains the speech to be matched is not limited in the present disclosure. Moreover, a length, a format, speech content, and other parameters of the speech to be matched are not limited in the present disclosure.

The speech to be matched may be obtained by performing the following speech processing on the original speech: The electronic device may perform speech segmentation on the original speech, to obtain speech segments of different voice roles in the original speech, and then may cluster the speech segments of the different voice roles, to obtain a set of speeches to be matched corresponding to each voice role. During this process, if the original speech has a section in which speeches of a plurality of voice roles overlap, that is, there is an overlapping speech segment, then before the speech segmentation is performed, speech separation is performed on the overlapping speech segment, to obtain a speech segment corresponding to each voice role, which in turn ensures that there is no voice from another voice role in the set of speeches to be matched of each voice role, and ensures that errors do not occur in the subsequent spectral feature extraction and timbre feature extraction processes.

The spectral feature of the speech to be matched may include, but is not limited to: a mel-frequency cepstral coefficients (MFCC) feature, a Fbanks feature, or the like. Certainly, the spectral feature of the speech to be matched may further include another type of spectral feature, which is not limited in the present disclosure.

The electronic device may utilize an acoustic feature extraction model to perform the spectral feature extraction on the speech to be matched. Specifically, the speech to be matched may be input to the acoustic feature extraction model, and the acoustic feature extraction model outputs the spectral feature of the speech to be matched by performing feature construction and conversion on the speech to be matched.

The type, the network structure, and the like of the acoustic feature extraction model are not limited in the present disclosure.

S102: Perform timbre feature extraction on the spectral feature of the speech to be matched, to obtain a timbre feature of the speech to be matched.

The timbre feature of the speech to be matched may include a timbre style feature and/or a voiceprint feature. Certainly, the timbre feature of the speech to be matched may further include features of the timbre in other specific dimensions, which is not limited in the present disclosure.

The timbre style feature is used to characterize a style to which the timbre belongs. The timbre may be pre-categorized into various styles, and the categorization manner of the timbre styles is not limited in the present disclosure. For example, the timbre styles may include: lively, energetic, authoritative, youthful, sweet, sophisticated, and the like.

The voiceprint feature is a sound wave spectral feature carrying speech information and displayed by an electroacoustic instrument. The closer the voiceprint features, the more similar the timbres. Therefore, a target sample audio with a timbre close to that of the speech to be matched may be selected from at least one initial sample audio by comparing a similarity between the voiceprint features.

The electronic device may utilize a timbre feature extraction model to perform the timbre feature extraction on the speech to be matched, to obtain the timbre feature of the speech to be matched. Specifically, the spectral feature of the speech to be matched may be input to the timbre feature extraction model, and the timbre feature extraction model outputs the timbre feature of the speech to be matched by performing conversion on the spectral feature of the speech to be matched.

Moreover, the timbre feature extraction model may include one or more timbre feature extraction sub-models. Each timbre feature extraction sub-model is configured to extract a feature, in one specific dimension, of the timbre of the speech. For example, if the timbre feature includes the timbre style feature and the voiceprint feature, then the timbre feature extraction model may include a timbre style feature extraction sub-model and a voiceprint feature extraction sub-model. The spectral feature of the speech to be matched is input to each of the timbre style feature extraction sub-model and the voiceprint feature extraction sub-model. The timbre category feature extraction sub-model and the voiceprint feature extraction sub-model each process the spectral feature of the speech to be matched, to output a timbre feature in a corresponding specific dimension.

S103: Determine a target sample audio from at least one initial sample audio based on the timbre feature of the speech to be matched and a timbre feature of the at least one initial sample audio, where the timbre feature of the target sample audio matches the timbre feature of the speech to be matched.

The electronic device may analyze a similarity between features, in a specific dimension, of the timbre of the speech to be matched and the timbre of each initial sample audio based on the timbre feature of the speech to be matched and the timbre feature of each initial sample audio, to determine, from the at least one initial sample audio, the target sample audio matching the timbre feature of the speech to be matched.

The timbre feature of the initial sample audio includes features of the timbre in various specific dimensions, which may be pre-stored, or may be obtained by performing real-time timbre feature extraction on the initial sample audio. If the timbre feature of the initial sample audio is obtained by performing the real-time timbre feature extraction on the initial sample audio, a method similar to that of obtaining the timbre feature of the speech to be matched may be used for implementation. For brevity, details are not described herein again.

In a possible implementation, according to an order of features, in various specific dimensions, included in the timbre feature, the electronic device may perform step-by-step selection on the at least one initial sample audio based on the similarity between the features, in the specific dimensions, of the timbre feature of the speech to be matched and the timbre feature of the at least one initial sample audio, to determine the target sample audio.

Figure 2:
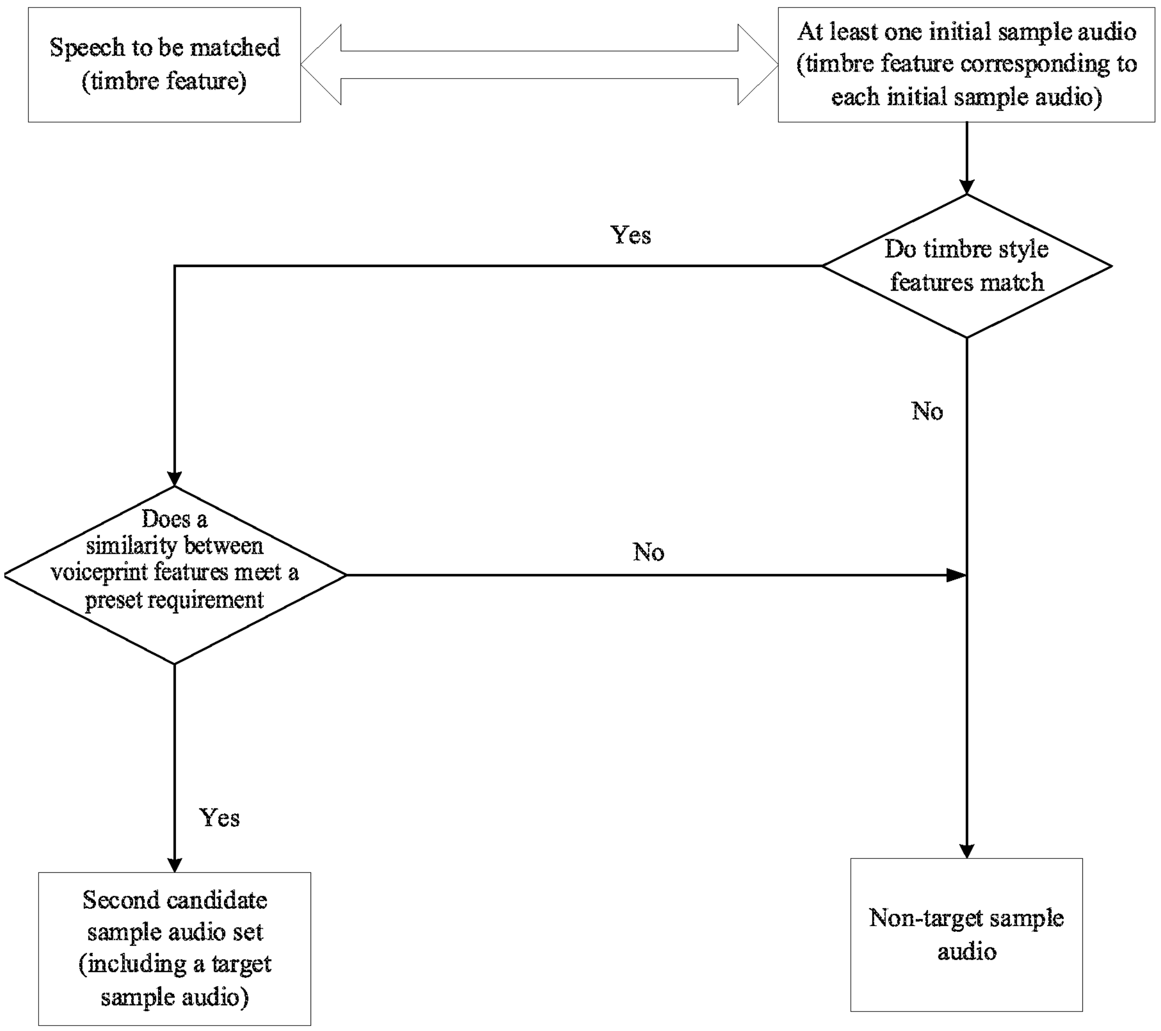
FIG. 2 is a schematic flowchart of a timbre selection method according to another embodiment of the present disclosure.

Taking the order of the features, in the specific dimensions, included in the timbre feature being sequentially the timbre style feature and the voiceprint feature as an example, S103 is described in detail in conjunction with the embodiment shown in FIG. 2.

Referring to FIG. 2, first, for each initial sample audio, the timbre style feature of the speech to be matched is compared with that of the initial sample audio, to determine whether the timbre styles are the same. If the timbre styles are the same, the initial sample audio is marked as a candidate sample audio available for a next-step comparison; and if the timbre styles are not the same, the initial sample audio is marked as a non-target sample audio. A first candidate sample audio set is obtained through this step, where a timbre style feature of each initial sample audio included in the candidate sample audio set matches the timbre style feature of the speech to be matched.

Then, for each initial sample audio included in the first candidate sample audio set, a voiceprint feature of the speech to be matched is compared with a voiceprint feature of the initial sample audio, to obtain a similarity between the voiceprint features. Similarities between the voiceprint feature of the speech to be matched and voiceprint features of the initial sample audios in the first candidate sample audio set are then sorted. For example, based on the descending order of the similarities or the magnitude of the similarities, one or more initial sample audios meeting a preset requirement may be determined as an initial sample audio included in a second candidate sample audio set, and then the target sample audio may be determined from the second candidate sample set.

A timbre style feature of each initial sample audio included in the second candidate sample audio set matches the timbre style feature of the speech to be matched, and a similarity between a voiceprint feature of each initial sample audio included in the second candidate sample audio set and the voiceprint feature of the speech to be matched meets the preset requirement.

It can be understood that if the second candidate sample audio set includes one initial sample audio, then the initial sample audio is the target sample audio; and if the second candidate sample audio set includes a plurality of initial sample audios, then one initial sample audio may be randomly determined from the plurality of initial sample audios as the target sample audio; or all of the plurality of initial sample audios included in the second candidate sample audio set may be recommended to a user, and the target sample audio may be determined based on the user's selection.

It should be noted that the order of the various specific dimensions in the embodiment shown in FIG. 2 is merely an example, which is not limited in the present disclosure. For example, one selection may be performed based on voiceprint features, followed by a next-step selection based on timbre style features, to determine the target sample audio.

Moreover, if the timbre feature further includes features in other specific dimensions, a method similar to that shown in FIG. 2 may be used for step-by-step selection, and during the step-by-step selection process, the order of the various specific dimensions may be flexibly set.

According to the method provided in this embodiment, the timbre feature of the speech to be matched is obtained by analyzing the spectral feature of the speech to be matched, and then the target sample audio is determined from the at least one initial sample audio based on the similarity between the timbre feature of the speech to be matched and the timbre feature of the at least one initial sample audio, where the timbre feature of the target sample audio matches the timbre feature of the speech to be matched. The method provided in the present disclosure enables automatic timbre selection, thereby improving efficiency in timbre selection. Additionally, the method provided in the present disclosure can meet the need for multi-role dubbing, that is, a suitable timbre can be automatically selected for each role using the above method.

Figure 3:
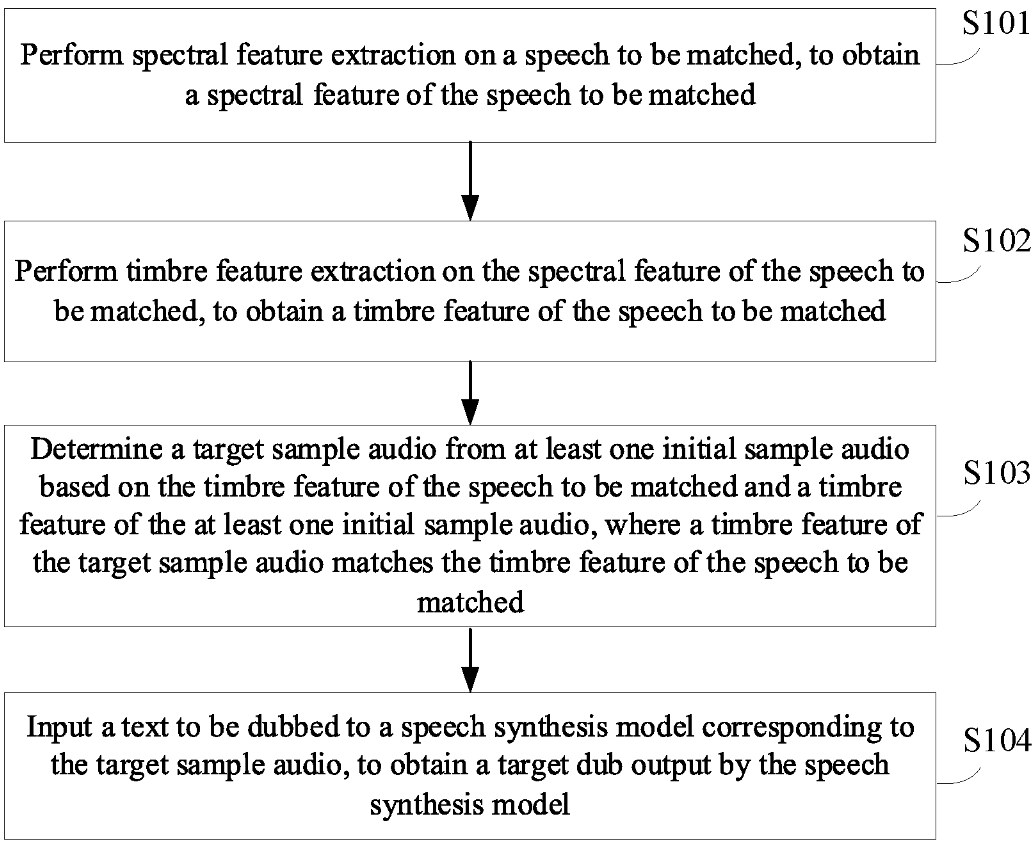
FIG. 3 is a schematic flowchart of a timbre selection method according to another embodiment of the present disclosure.

FIG. 3 is a schematic flowchart of a timbre selection method according to another embodiment of the present disclosure. On the basis of the embodiment shown in FIG. 1, after step S103 of determining the target sample audio from the at least one initial sample audio based on the timbre feature set of the speech to be matched and the timbre feature of the at least one sample audio, the method may further include the following step:

S104: Input a text to be dubbed to a speech synthesis model corresponding to the target sample audio, to obtain a target dub output by the speech synthesis model.

The text to be dubbed is used for text-to-speech conversion, where the text to be dubbed includes a symbolic representation corresponding to a desired audio. For example, the text to be dubbed may include one or more characters. For another example, the text to be dubbed may also include one or more phonemes. After the text to be dubbed is input to the speech synthesis model corresponding to the target sample audio, the speech synthesis model can analyze the text to be dubbed, and output the target dub corresponding to the text to be dubbed, where a timbre of the target dub matches the timbre of the speech to be matched.

The type, the network structure, and other parameters of the speech synthesis model are not limited in the present disclosure.

According to the method provided in this embodiment, the timbre feature of the speech to be matched is obtained by analyzing the spectral feature of the speech to be matched, and then the target sample audio is determined from the at least one initial sample audio based on the similarity between the timbre feature of the speech to be matched and the timbre feature of the at least one initial sample audio, where the timbre feature of the target sample audio matches the timbre feature of the speech to be matched. The method provided in the present disclosure enables automatic timbre selection, thereby improving efficiency in timbre selection. Additionally, the method provided in the present disclosure can meet the need for multi-role dubbing, that is, a suitable timbre can be automatically selected for each role using the above method. Through the speech synthesis using the speech synthesis model corresponding to the determined target sample audio, the timbre of the resulting target dub can meet expectations.

Figure 4:
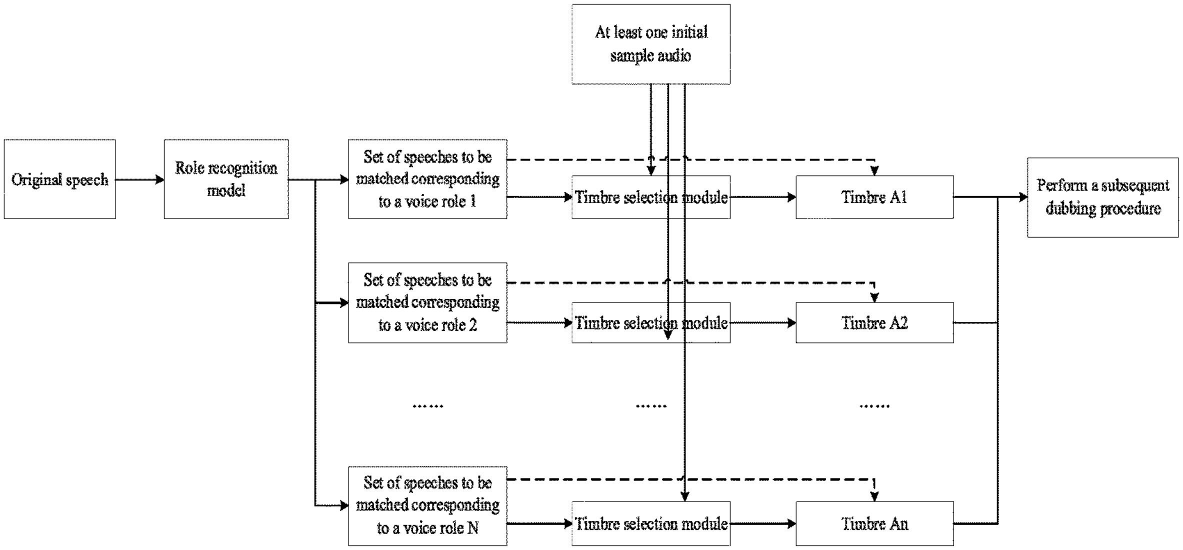
FIG. 4 is a schematic flowchart of a timbre selection method according to another embodiment of the present disclosure.

Based on the foregoing embodiments, the timbre selection method provided in the present disclosure can be applied to scenarios where there is a dubbing need for multiple voice roles, to determine a dubbing timbre corresponding to each of the multiple voice roles. FIG. 4 is an overall schematic flowchart of respectively selecting timbres for a plurality of voice roles according to another embodiment of the present disclosure.

Referring to FIG. 4, a spectral feature extraction model, a timbre feature extraction model, and a matching module may be packaged as a timbre selection module, which may also be referred to as a timbre matching module, a timbre selection system, or another name.

It is assumed that suitable dubbing timbres need to be selected for N voice roles, where the N voice roles are respectively a voice role 1 to a voice role N. First, speech separation, speech segmentation, and clustering may be performed on an original speech, to obtain a set of speeches to be matched corresponding to each voice role. The original speech may include speech segments corresponding to the N voice roles, respectively.

Taking a set of speeches to be matched corresponding to the voice role 1 as an example, a speech to be matched corresponding to the voice role 1 and at least one initial sample audio from a sample audio library are input to the timbre selection module, and the timbre selection module may separately perform spectral feature extraction, timbre feature extraction, and timbre feature-based similarity comparison on the received speech to be matched corresponding to the voice role 1 and the at least one initial sample audio, to determine a target sample audio corresponding to the voice role 1, i.e., determine a dubbing timbre A1 for the voice role 1.

For each of the voice role 2 to the voice role 2, a processing process similar to that for the voice role 1 is performed, to determine a target sample audio corresponding to each of the voice role 2 to the voice role N, i.e., determine dubbing timbres A2 to An corresponding to the voice role 2 to the voice role N, respectively.

Moreover, a plurality of timbre selection modules may be deployed, with each timbre selection module configured to perform, for one voice role, the timbre selection method provided in the present disclosure, to select a corresponding target sample audio for the voice role, where the plurality of timbre selection modules may perform the method in parallel to improve timbre selection efficiency.

After the dubbing timbres respectively corresponding to the voice role 1 to the voice role N are determined, a subsequent dubbing procedure may be performed. For example, texts to be dubbed respectively corresponding to the voice role 1 to the voice role N may be input to speech synthesis models respectively corresponding to the voice role 1 to the voice role N, to obtain dubbed audios respectively corresponding to the voice role 1 to the voice role N. Subsequently, the dubbed audios may be edited, stitched, etc., to obtain a complete dubbed audio desired by the user.

From the foregoing embodiments, it can be known that in the present disclosure, for each voice role, the timbre feature of the speech to be matched is obtained by analyzing the spectral feature of the speech to be matched corresponding to each voice role, and then the dubbing timbre corresponding to each voice role is determined from the at least one initial sample audio based on the similarity between the timbre feature of the speech to be matched and the timbre feature of the at least one initial sample audio The method provided in this embodiment enables automatic timbre selection, thereby improving efficiency in timbre selection. Additionally, the method provided in this embodiment can meet the dubbing need for multiple voice roles, that is, a suitable timbre can be automatically selected for each voice role using the above method. Through the speech synthesis using the speech synthesis model corresponding to the determined target sample audio, the timbre of the resulting target dub can meet expectations.

For example, the present disclosure further provides a timbre selection apparatus.

Figure 5:
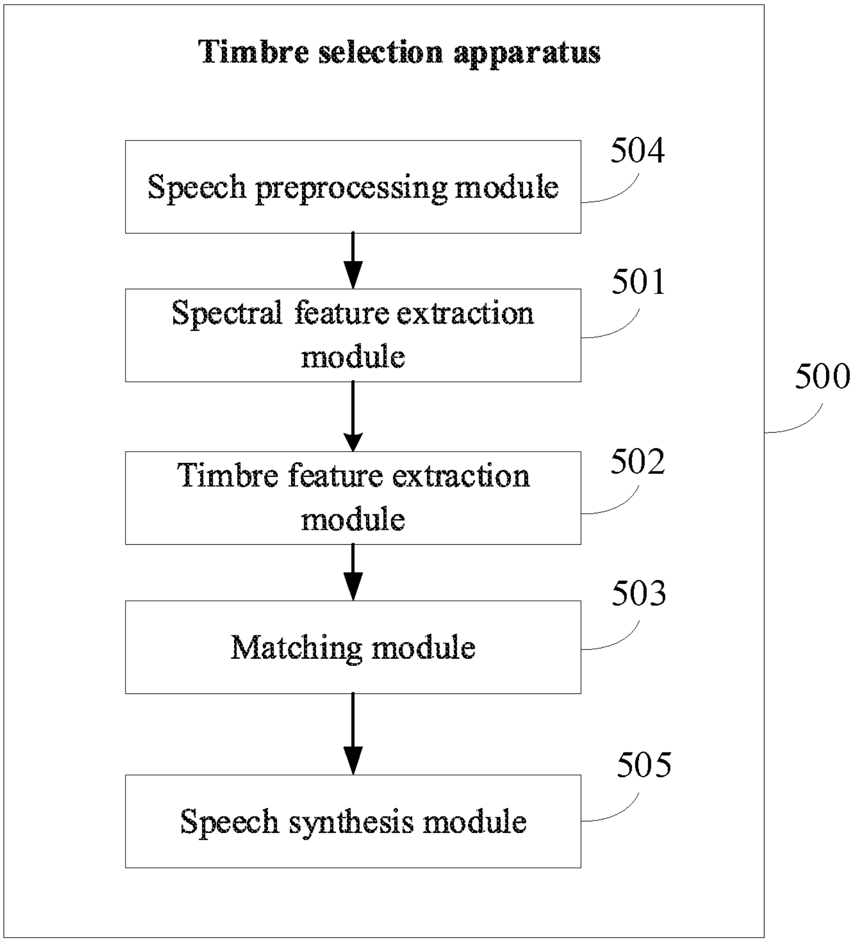
FIG. 5 is a schematic diagram of a structure of a timbre selection apparatus according to some embodiments of the present disclosure.

FIG. 5 is a schematic diagram of a structure of a timbre selection apparatus according to some embodiments of the present disclosure. Referring to FIG. 5, the timbre selection apparatus 500 provided in this embodiment includes:

a spectral feature extraction module 501 configured to perform spectral feature extraction on a speech to be matched, to obtain a spectral feature of the speech to be matched;

a timbre feature extraction module 502 configured to perform timbre feature extraction on the spectral feature of the speech to be matched, to obtain a timbre feature of the speech to be matched; and a matching module 503 configured to determine a target sample audio from at least one initial sample audio based on the timbre feature of the speech to be matched and a timbre feature of the at least one initial sample audio, where a timbre of the target sample audio matches the timbre feature of the speech to be matched.

As a possible implementation, the matching module 503 is specifically configured to obtain a similarity between a feature, in the specific dimension, of the timbre of the speech to be matched and the timbre of the at least one initial sample audio in the specific dimension according to a preset order corresponding to the one or more specific dimensions; and perform step-by-step selection based on the similarity between the feature, in the specific dimension, of the timbre of the speech to be matched and the timbre of the at least one initial sample audio in the specific dimension, to determine the target sample audio from the at least one initial sample audio.

As a possible implementation, the feature of the timbre in the one or more specific dimensions includes a timbre style feature and/or a voiceprint feature.

As a possible implementation, the matching module 503 is specifically configured to determine a plurality of candidate sample audios from a plurality of initial sample audios based on the timbre feature of the speech to be matched and timbre features of the plurality of initial sample audios; and determine the target sample audio from the plurality of candidate sample audios.

As a possible implementation, the timbre selection apparatus 500 further includes: a speech preprocessing module 504 configured to perform speech segmentation on an original speech, to obtain at least one speech segment; and perform clustering on the at least one speech segment, to obtain the one or more speech segment sets, where each of the speech segment sets belongs to one voice role, and one of the speech segment sets includes the speech to be matched.

As a possible implementation, the speech preprocessing module 504 is further configured to: before performing the speech segmentation on the original speech, perform speech separation on an overlapping speech segment in the original speech, to obtain a speech segment corresponding to each user in the overlapping speech segment.

As a possible implementation, the timbre selection apparatus 500 further includes: a speech synthesis module 505 configured to input a text to be dubbed to a speech synthesis model corresponding to the target sample audio, to obtain a target dub output by the speech synthesis model.

The timbre selection apparatus provided in this embodiment may be configured to perform the technical solution of any one of the foregoing method embodiments. The implementation principle and technical effects thereof are similar, for which reference may be made to the detailed description of the foregoing method embodiments. For brevity, details are not described herein again.

Figure 6:
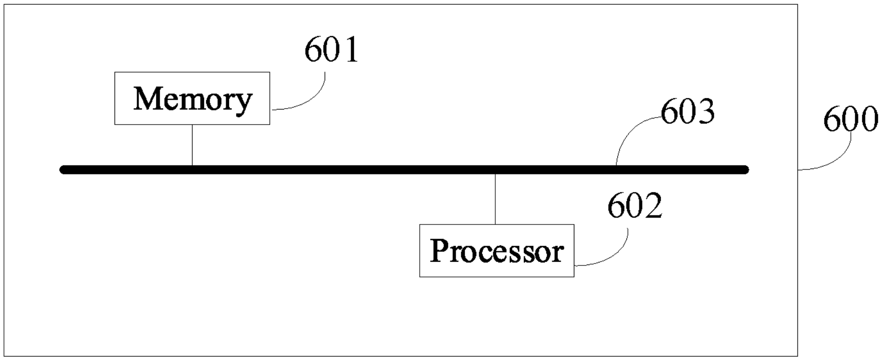
FIG. 6 is a schematic diagram of a structure of an electronic device according to some embodiments of the present disclosure.

FIG. 6 is a schematic diagram of a structure of an electronic device according to some embodiments of the present disclosure. Referring to FIG. 6, the electronic device 600 provided in this embodiment includes: a memory 601 and a processor 602.

The memory 601 may be an independent physical unit, and may be connected to the processor 602 via a bus 603. Alternatively, the memory 601 and the processor 602 may be integrated together, and may be implemented in hardware, etc.

The memory 601 is configured to store program instructions, and the processor 602 calls the program instructions to perform the operations of any one of the foregoing method embodiments.

Optionally, when some or all of the methods of the foregoing embodiments are implemented in software, the foregoing electronic device 600 may also include only the processor 602. The memory 601 configured to store a program is located outside the electronic device 600. The processor 602 is connected to the memory through a circuit/wire, and is configured to read and execute the program stored in the memory.

The processor 602 may be a central processing unit (CPU), a network processor (NP), or a combination of a CPU and an NP.

The processor 602 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 601 may include a volatile memory, such as a random-access memory (RAM). The memory may also include a non-volatile memory, such as a flash memory, a hard disk drive (HDD), or a solid-state drive (SSD). The memory may also include a combination of the above types of memories.

Some embodiments of the present disclosure further provide a readable storage medium, including computer program instructions. When the computer program instructions are executed by at least one processor of an electronic device, the timbre selection method shown in any one of the method embodiments is implemented.

Some embodiments of the present disclosure further provide a computer program product including a computer program stored in a readable storage medium. At least one processor of an electronic device may read the computer program from the readable storage medium. The at least one processor executes the computer program to cause the electronic device to implement the timbre selection method shown in any one of the method embodiments.

It should be noted that as used herein, the relationship terms such as “first” and “second” are used to distinguish one entity or operation from another, without necessarily requiring or implying any actual relationship or order between these entities or operations. Moreover, the terms “include”, “comprise”, or any other variants thereof are intended to cover a non-exclusive inclusion, so that a process, a method, an article, or a device that includes a list of elements not only includes those elements but also includes other elements that are not listed, or further includes elements inherent to such a process, method, article, or device. In the absence of more restrictions, an element defined by “including a . . . ” does not exclude another same element in a process, method, article, or device that includes the element.

The above description illustrates merely specific implementations of the present disclosure, so that those skilled in the art can understand or implement the present disclosure. Various modifications to these embodiments are apparent to those skilled in the art, and the general principle defined herein may be practiced in other embodiments without departing from the spirit or scope of the present disclosure. Therefore, the present disclosure is not limited to the embodiments described herein but is to be accorded the broadest scope consistent with the principle and novel features disclosed herein.

The invention claimed is:

1. A method of implementing automatic timbre selection for audio dubbing, comprising:

performing spectral feature extraction on a speech of a voice role among a plurality of voice roles to obtain a spectral feature of the voice role;

performing timbre feature extraction on the spectral feature of the voice role to obtain a timbre feature of the voice role;

determining a target sample audio from at sample audio library as a dubbing timbre for the voice role based on the timbre feature of the voice role and a timbre feature of at least one initial sample audio in the sample audio library, wherein a timbre of the target sample audio matches the timbre feature of the voice role; and generating a dubbed audio for the voice role based on the target sample audio that has the same timber style as the speech of the voice role.

2. The method according to claim 1, wherein the timbre feature comprises a feature in one or more specific dimensions; and the determining a target sample audio from at sample audio library based on the timbre feature of the voice role and a timbre feature of at least one initial sample audio in the sample audio library comprises:

obtaining a similarity between a feature, in the specific dimension, of the timbre of the voice role and the timbre of the at least one initial sample audio in the specific dimension according to a preset order corresponding to the one or more specific dimensions; and performing step-by-step selection based on the similarity between the feature, in the specific dimension, of the timbre of the voice role and the timbre of the at least one initial sample audio in the specific dimension, to determine the target sample audio from the at least one initial sample audio.

3. The method according to claim 2, wherein the feature in the one or more specific dimensions comprises at least one of a timbre style feature or a voiceprint feature.

4. The method according to claim 1, wherein the determining a target sample audio from at sample audio library based on the timbre feature of the voice role and a timbre feature of at least one initial sample audio in the sample audio library comprises:

determining a plurality of candidate sample audios from a plurality of initial sample audios based on the timbre feature of the voice role and timbre features of the plurality of initial sample audios; and determining the target sample audio from the plurality of candidate sample audios.

5. The method according to claim 1, wherein before the performing spectral feature extraction on a speech of a voice role, the method further comprises:

performing speech segmentation on an original speech, to obtain at least one speech segment; and performing clustering on the at least one speech segment, to obtain the one or more speech segment sets, wherein each of the speech segment sets belongs to one voice role, and one of the speech segment sets comprises the speech to be matched.

6. The method according to claim 5, wherein before the performing speech segmentation on an original speech, the method further comprises:

performing speech separation on an overlapping speech segment in the original speech, to obtain a speech segment corresponding to each voice role in the overlapping speech segment.

7. The method according to claim 1, wherein the method further comprises:

inputting a text to be dubbed to a speech synthesis model corresponding to the target sample audio, to obtain a target dub output by the speech synthesis model.

8. An electronic device, comprising: a memory and a processor;

wherein the memory is configured to store computer program instructions; and the processor is configured to execute the computer program instructions, to implement operations comprising:

performing spectral feature extraction on a speech of a voice role among a plurality of voice roles to obtain a spectral feature of the voice role;

performing timbre feature extraction on the spectral feature of the voice role to obtain a timbre feature of the voice role;

determining a target sample audio from at sample audio library as a dubbing timbre for the voice role based on the timbre feature of the voice role and a timbre feature of at least one initial sample audio in the sample audio library, wherein a timbre of the target sample audio matches the timbre feature of the voice role; and generating a dubbed audio for the voice role based on the target sample audio that has the same timber style as the speech of the voice role.

9. The electronic device according to claim 8, wherein the timbre feature comprises a feature in one or more specific dimensions; and the determining a target sample audio from at sample audio library based on the timbre feature of the voice role and a timbre feature of at least one initial sample audio in the sample audio library comprises:

obtaining a similarity between a feature, in the specific dimension, of the timbre of the voice role and the timbre of the at least one initial sample audio in the specific dimension according to a preset order corresponding to the one or more specific dimensions; and performing step-by-step selection based on the similarity between the feature, in the specific dimension, of the timbre of the voice role and the timbre of the at least one initial sample audio in the specific dimension, to determine the target sample audio from the at least one initial sample audio.

10. The electronic device according to claim 9, wherein the feature in the one or more specific dimensions comprises at least one of a timbre style feature or a voiceprint feature.

11. The electronic device according to claim 8, wherein the determining a target sample audio from at sample audio library based on the timbre feature of the voice role and a timbre feature of at least one initial sample audio in the sample audio library comprises:

determining a plurality of candidate sample audios from a plurality of initial sample audios based on the timbre feature of the voice role and timbre features of the plurality of initial sample audios; and determining the target sample audio from the plurality of candidate sample audios.

12. The electronic device according to claim 8, wherein before the performing spectral feature extraction on a speech of a voice role, the operations further comprise:

performing speech segmentation on an original speech, to obtain at least one speech segment; and performing clustering on the at least one speech segment, to obtain the one or more speech segment sets, wherein each of the speech segment sets belongs to one voice role, and one of the speech segment sets comprises the speech to be matched.

13. The electronic device according to claim 8, wherein the operations further comprise:

inputting a text to be dubbed to a speech synthesis model corresponding to the target sample audio, to obtain a target dub output by the speech synthesis model.

14. A non-transitory readable storage medium, comprising: computer program instructions; wherein the computer program instructions, when executed by at least one processor, cause the at least one processor to perform operations comprising:

performing spectral feature extraction on a speech of a voice role among a plurality of voice roles to obtain a spectral feature of the voice role;

performing timbre feature extraction on the spectral feature of the voice role to obtain a timbre feature of the voice role;

determining a target sample audio from at sample audio library as a dubbing timbre for the voice role based on the timbre feature of the voice role and a timbre feature of at least one initial sample audio in the sample audio library, wherein a timbre of the target sample audio matches the timbre feature of the voice role; and generating a dubbed audio for the voice role based on the target sample audio that has the same timber style as the speech of the voice role.

15. The non-transitory readable storage medium according to claim 14, wherein the timbre feature comprises a feature in one or more specific dimensions; and the determining a target sample audio from a sample audio library based on the timbre feature of the voice role and a timbre feature of at least one initial sample audio in the sample audio library comprises:

obtaining a similarity between a feature, in the specific dimension, of the timbre of the voice role and the timbre of the at least one initial sample audio in the specific dimension according to a preset order corresponding to the one or more specific dimensions; and performing step-by-step selection based on the similarity between the feature, in the specific dimension, of the timbre of the voice role and the timbre of the at least one initial sample audio in the specific dimension, to determine the target sample audio from the at least one initial sample audio.

16. The non-transitory readable storage medium according to claim 15, wherein the feature in the one or more specific dimensions comprises at least one of a timbre style feature or a voiceprint feature.

17. The non-transitory readable storage medium according to claim 14, wherein the determining a target sample audio from a sample audio library based on the timbre feature of the speech to be matched voice role and a timbre feature of at least one initial sample audio in the sample audio library comprises:

determining a plurality of candidate sample audios from a plurality of initial sample audios based on the timbre feature of the speech to be matched voice role and timbre features of the plurality of initial sample audios; and determining the target sample audio from the plurality of candidate sample audios.

18. The non-transitory readable storage medium according to claim 14, wherein before the performing spectral feature extraction on a speech of a voice role, the operations further comprise:

performing speech segmentation on an original speech, to obtain at least one speech segment; and performing clustering on the at least one speech segment, to obtain the one or more speech segment sets, wherein each of the speech segment sets belongs to one voice role, and one of the speech segment sets comprises the speech to be matched.

19. The non-transitory readable storage medium according to claim 18, wherein before the performing speech segmentation on an original speech, the operations further comprise:

performing speech separation on an overlapping speech segment in the original speech, to obtain a speech segment corresponding to each voice role in the overlapping speech segment.

20. The non-transitory readable storage medium according to claim 14, wherein the operations further comprise: inputting a text to be dubbed to a speech synthesis model corresponding to the target sample audio, to obtain a target dub output by the speech synthesis model.

* * * * *